(12) United States Patent
Hasebe et al.

(10) Patent No.: US 7,944,792 B2
(45) Date of Patent: May 17, 2011

(54) INFORMATION RECORDING MEDIUM, DATA STRUCTURE, AND RECORDING APPARATUS

(75) Inventors: Tsuyoshi Hasebe, Tokorozawa (JP); Tsuyoshi Namiki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 559 days.

(21) Appl. No.: 12/088,249

(22) PCT Filed: Sep. 26, 2006

(86) PCT No.: PCT/JP2006/319079
§ 371 (c)(1),
(2), (4) Date: Mar. 27, 2008

(87) PCT Pub. No.: WO2007/037238
PCT Pub. Date: Apr. 5, 2007

(65) Prior Publication Data
US 2009/0040892 A1    Feb. 12, 2009

(30) Foreign Application Priority Data
Sep. 28, 2005 (JP) .................................. 2005-282771

(51) Int. Cl.
*G11B 20/10* (2006.01)
*G11B 7/24* (2006.01)

(52) U.S. Cl. .................................. 369/59.25; 369/275.3

(58) Field of Classification Search ............... 369/59.25, 369/275.3; 386/95, 125, 126
See application file for complete search history.

(56) References Cited

U.S. PATENT DOCUMENTS

| | | | |
|---|---|---|---|
| 2003/0076764 A1* | 4/2003 | Iwano et al. | 369/99 |
| 2003/0223737 A1 | 12/2003 | Shibutani | |
| 2004/0018003 A1 | 1/2004 | Yako | |
| 2004/0151083 A1 | 8/2004 | Ichikawa et al. | |
| 2006/0204219 A1* | 9/2006 | Kamio | 386/95 |
| 2006/0209653 A1* | 9/2006 | Shoji et al. | 369/53.24 |
| 2006/0215997 A1* | 9/2006 | Kamio et al. | 386/95 |
| 2006/0250922 A1* | 11/2006 | Sasaki | 369/59.25 |

FOREIGN PATENT DOCUMENTS

| | | |
|---|---|---|
| JP | 2003-178518 | 6/2003 |
| JP | 2004-5853 | 1/2004 |
| JP | 2004-55083 | 2/2004 |
| JP | 2004-213714 | 7/2004 |
| WO | WO 2004/109680 | 12/2004 |

* cited by examiner

*Primary Examiner* — Thang V Tran
(74) *Attorney, Agent, or Firm* — Young & Thompson

(57) ABSTRACT

A video object (26) contains a cell (31) which can be appropriately read and reproduced and a dummy cell (32) which cannot be appropriately read or reproduced. Video title set information (21) contains a plurality of program chains (40) containing a real program chain not specifying the dummy cell (32) and a virtual program chain specifying the dummy cell (32).

6 Claims, 6 Drawing Sheets

[FIG. 1]
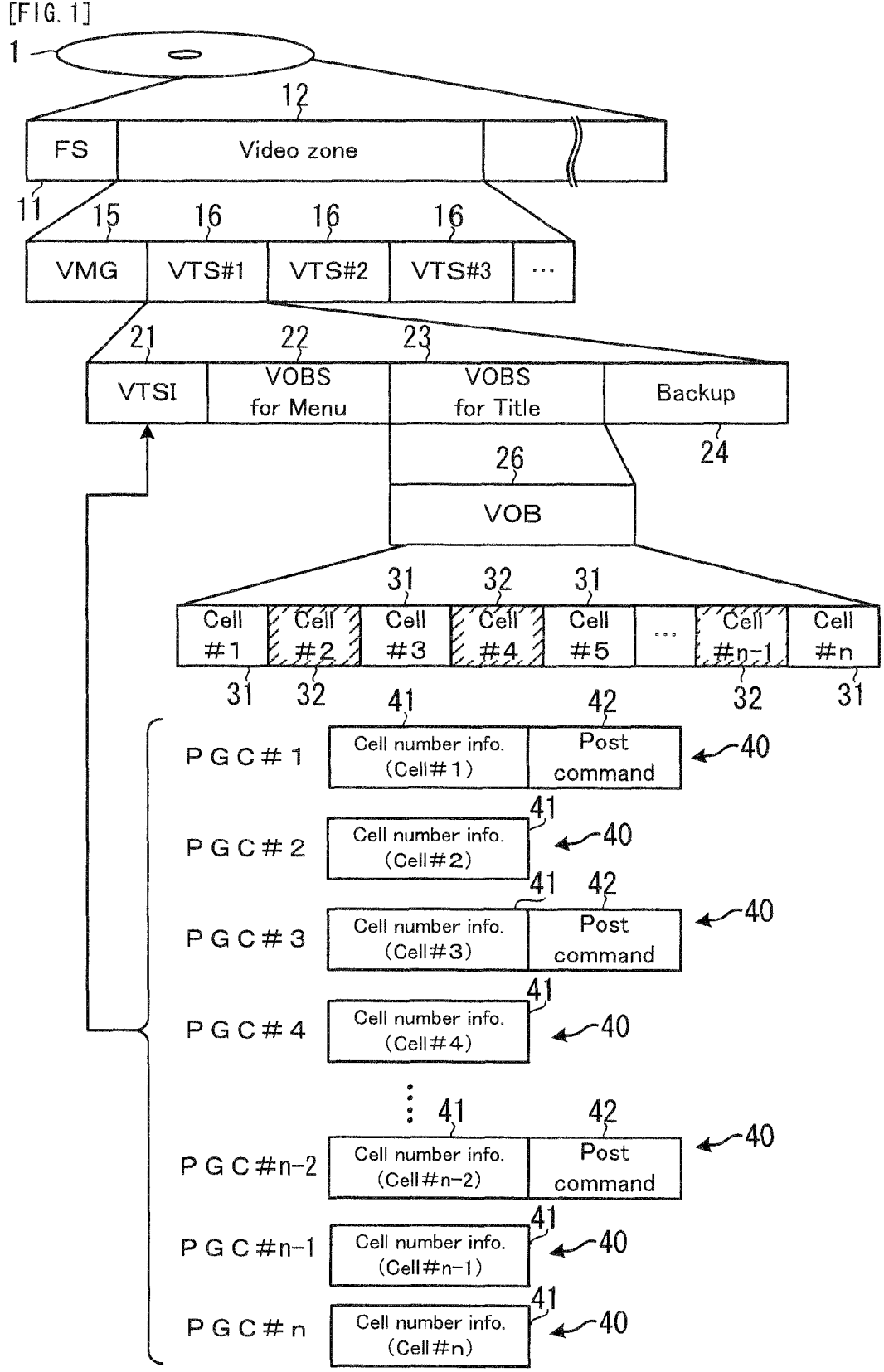

[FIG. 2]
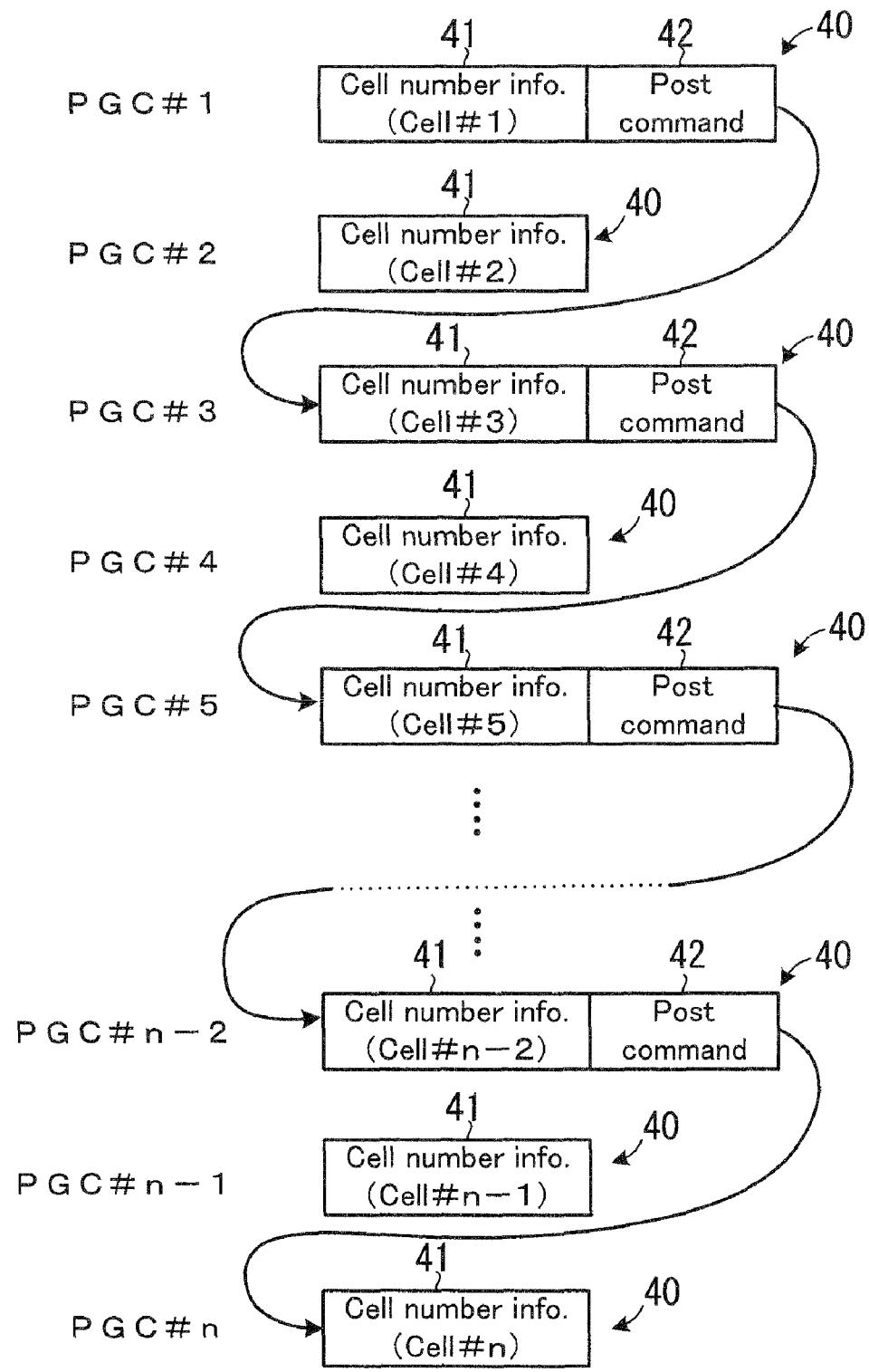

[FIG. 3]
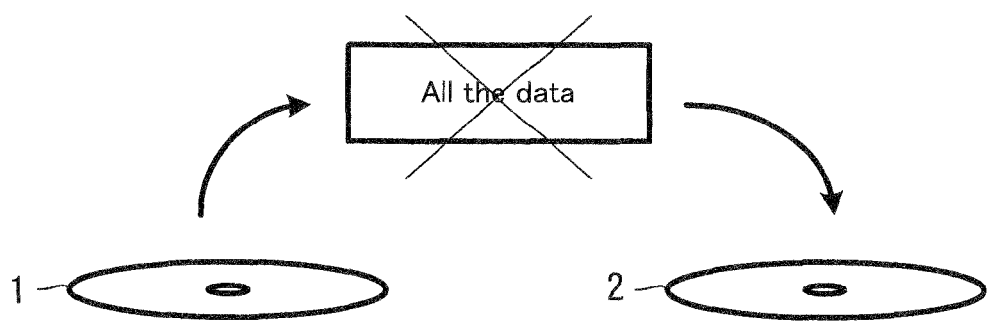
[FIG. 4]
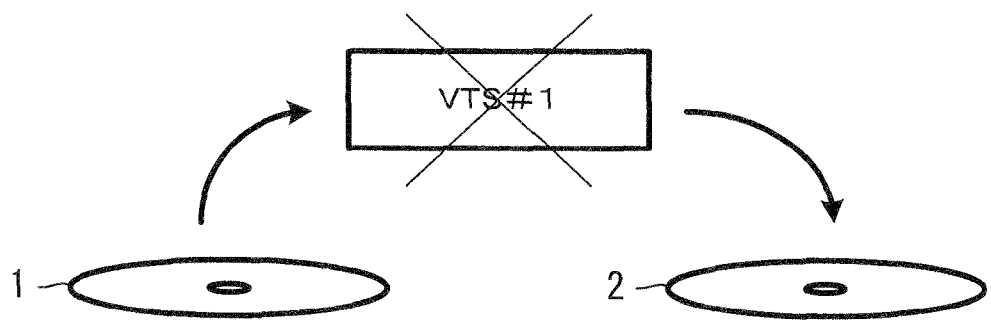

[FIG. 5]
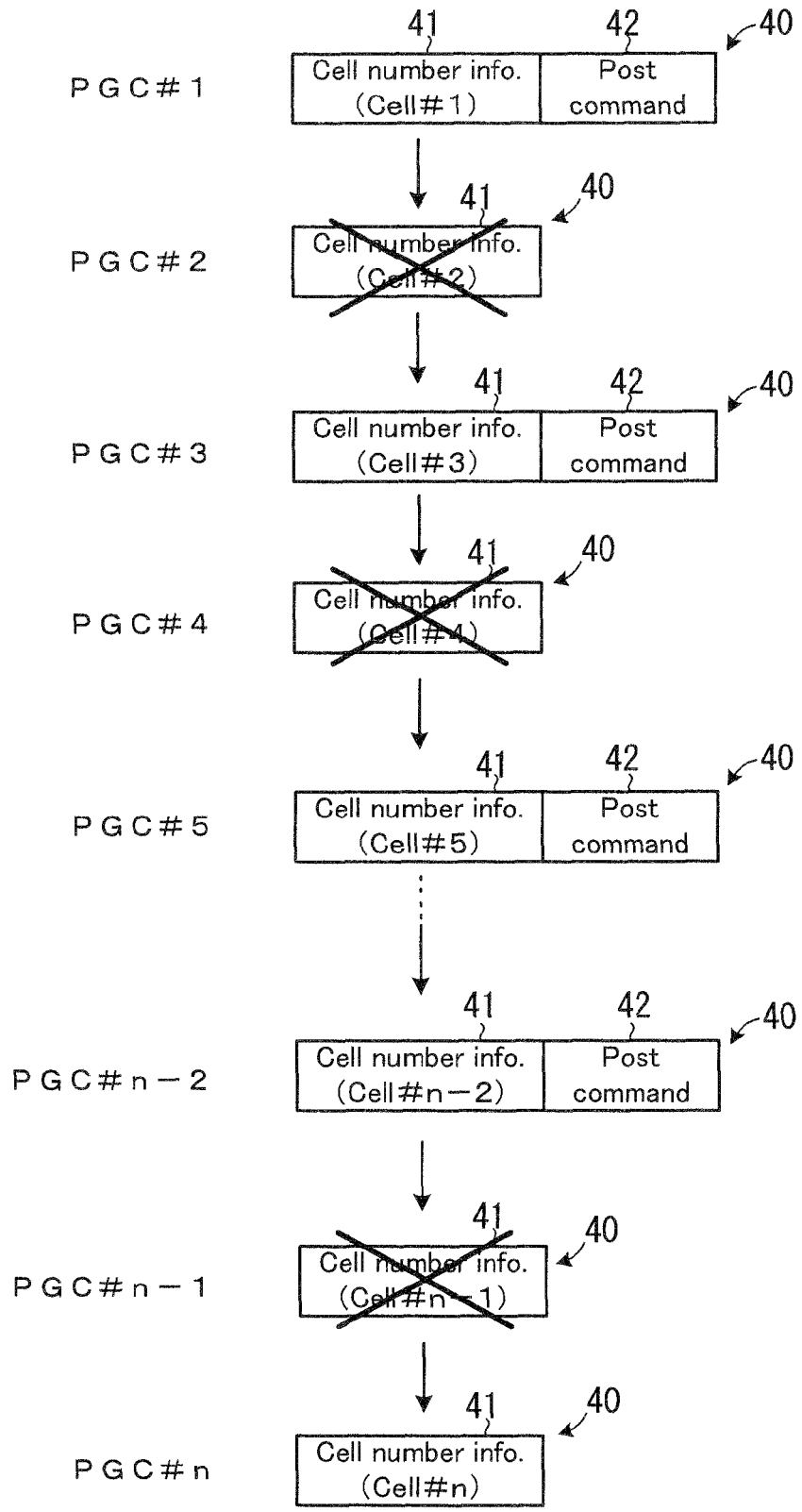

[FIG. 6]
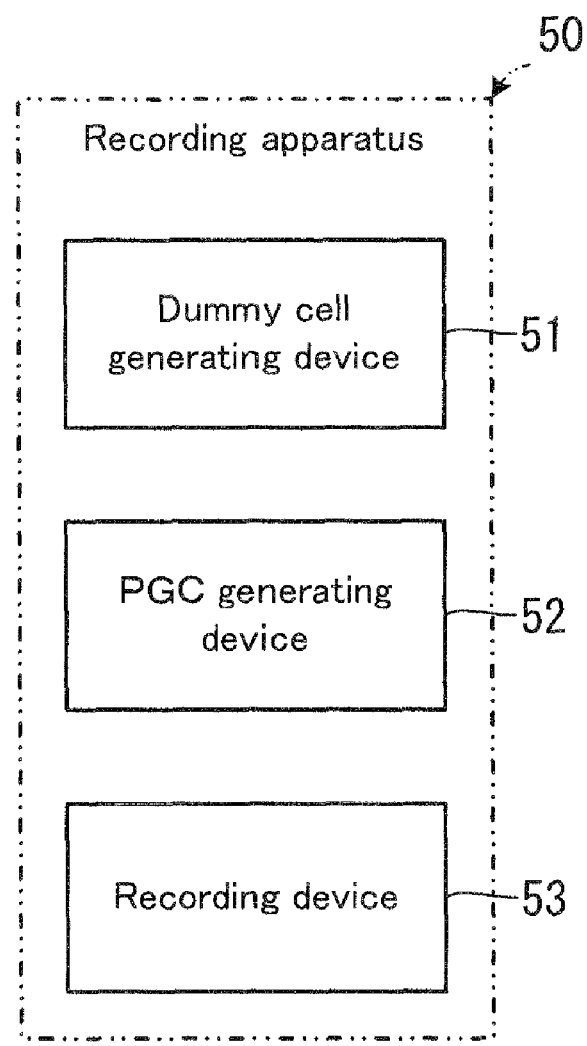

[FIG. 7]
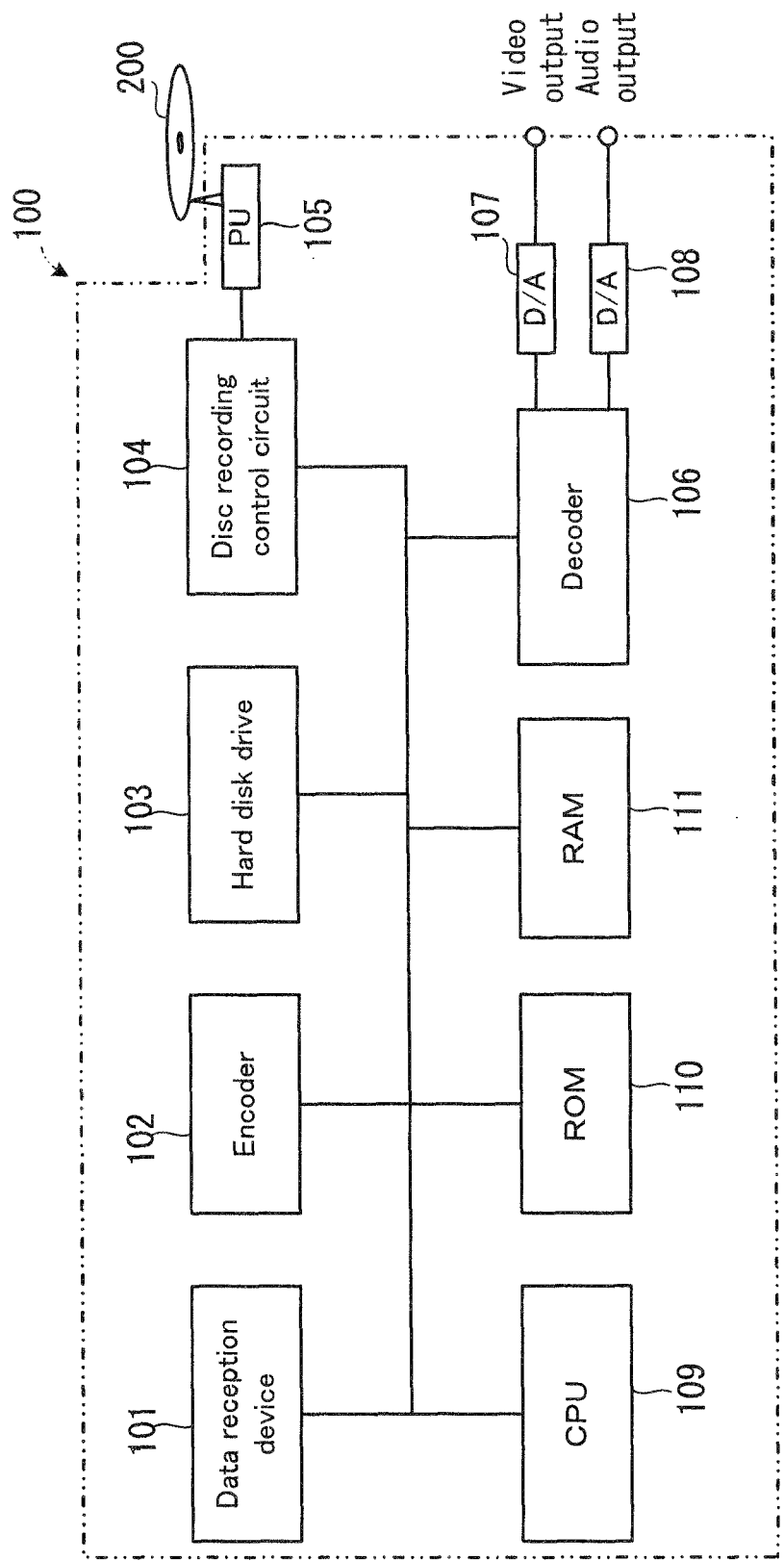

INFORMATION RECORDING MEDIUM, DATA STRUCTURE, AND RECORDING APPARATUS

TECHNICAL FIELD

The present invention relates to an information recording medium, such as a DVD, the structure of data recorded on the information recording medium, such as a DVD, and a recording apparatus, such as a DVD recorder, and more specifically relates to an information recording medium, a data structure, and a recording apparatus, which have a structure for realizing the prevention of illegal copy of content data.

BACKGROUND ART

For example, content data of a movie, music, or the like is recorded on a DVD. Such content data is digital data. Thus, even if the content data is copied, the data itself does not deteriorate. As a result, if one content data which is to be a source is obtained, it is possible to make many copies of content data with identical content. In addition, with the copied content data as a source, it is possible to further make copies of content data with identical content.

Thus, the information recording medium, such as a DVD, with such digital data recorded thereon is equipped with a measure to restrict the copy for copyright protection or the like. The most general of the measures is to encrypt the content data.

DISCLOSURE OF INVENTION

Subject to be Solved by the Invention

There are suggested some methods of encrypting the content data. These encryption methods use ingenuity not to easily decrypt the encrypted content data, such as setting encryption keys doubly or triply.

There is, however, a possibility to decrypt the encrypted content data by an obsessive analysis or the like, which is targeted for the leak of encryption information, such as the encryption key, and for the decryption, because the encrypted content data can be decrypted on a legitimate reproducing apparatus.

Thus, only the encryption of the content data hardly prevents the illegal copy, sufficiently, for the purpose of copyright protection.

In view of the above-exemplified problem, it is therefore an object of the present invention to provide an information recording medium and a data structure, which can strengthen the prevention of illegal copy.
Means for Solving the Object The above object of the present invention can be achieved by an information recording medium on which a plurality of data units and a plurality of reproduction specification information are recorded, each of the plurality of reproduction specification information specifying one or more data units from among the plurality of data units, the plurality of data units including an actual data unit, which can be properly read and reproduced, and an imaginary data unit, which cannot be properly read and reproduced, the plurality of reproduction specification information including actual reproduction specification information, which does not include specification of the imaginary data unit, and imaginary reproduction specification information, which includes specification of the imaginary data unit.

The above object of the present invention can be also achieved by a data structure provided with: a plurality of data units; and a plurality of reproduction specification information, each of the plurality of reproduction specification information specifying one or more data units from among the plurality of data units, the plurality of data units including an actual data unit, which can be properly read and reproduced, and an imaginary data unit, which cannot be properly read and reproduced, the plurality of reproduction specification information including actual reproduction specification information, which does not include specification of the imaginary data unit, and imaginary reproduction specification information, which includes specification of the imaginary data unit.

The above object of the present invention can be also achieved by a recording device provided with: an imaginary data unit generating device for generating an imaginary data unit which cannot be properly read; a first recording device for recording a plurality of data units onto the information recording medium, the plurality of data units including an actual data unit which can be properly read and reproduced and the imaginary data unit; a reproduction specification information generating device for generating a plurality of reproduction specification information, each of which specifies one or more data units from among the plurality of data units; and a second recording device for recording the plurality of reproduction specification information onto the information recording medium, the reproduction specification information generating device generating actual reproduction specification information, which does not include specification of the imaginary data unit, and imaginary reproduction specification information, which includes specification of the imaginary data unit, and including them in the plurality of reproduction specification information.

The above object of the present invention can be also achieved by a computer program making a computer function as the recording apparatus of the present invention (including its various aspects).

The above object of the present invention can be also achieved by a computer program product in a computer-readable medium for tangibly embodying a program of instructions executable by a computer, the computer program product making the computer function as the recording apparatus of the present invention (including its various aspects).

According to each of the computer program products of the present invention, the aforementioned recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned recording apparatus of the present invention.

These effects and other advantages of the present invention will become more apparent from the following embodiment and example.

BRIEF DESCRIPTION OF DRAWINGS

FIG. 1 is an explanatory diagram showing a data structure in an embodiment of the present invention.

FIG. 2 is an explanatory diagram showing a reproduction operation on a reproducing apparatus in executing program chains included in the data structure in FIG. 1.

FIG. 3 is an explanatory diagram showing a situation in which it is tried to read all the data from a DVD and copy this to another DVD.

FIG. 4 is an explanatory diagram showing a situation in which it is tried to read one video title set from the DVD and copy this to another DVD.

FIG. 5 is an explanatory diagram showing a situation in which it is tried to analyze the program chain recorder on the DVD, extract only cells which constitute the video title set, and copy this to another DVD.

FIG. 6 is an explanatory diagram showing a recording apparatus in an embodiment of the present invention.

FIG. 7 is an explanatory diagram showing a DVD player which applies the present invention.

DESCRIPTION OF REFERENCE CODES 1, 200 DVD
16 video title set
26 video object
31 cell
32 dummy cell
40 program chain
41 cell number information
42 post command
50 recording apparatus
51 dummy data generating device
52 program chain generating device
53 recording device
100 DVD recorder
104 disc recording control circuit
105 optical pickup
109 CPU
110 ROM

BEST MODE FOR CARRYING OUT THE INVENTION

Hereinafter, the best mode for carrying out the present invention will be explained in each embodiment in order with reference to the drawings.
(Embodiment of Information Recording Medium)

FIG. 1 shows a data structure in an embodiment of the present invention. As shown in FIG. 1, a plurality of sets of content data are recorded on a DVD 1, and the sets of content data have a structure according to, for example, the data structure in a DVD video standard.

Specifically, on the inner circumferential side of a recording area on the DVD 1, there is a lead-in area (not illustrated), followed by disc management information including a file system (FS) 11 recorded. An area following the area with the disc management information recorded is a video zone 12, in which video manger (VMG) 15, which is management information, is recorded followed by a plurality of video title sets 16.

Each video title set 16 includes video title set information (VTSI) 21, followed by video object set for menu (VOB for Menu) 22, video object set for title (VOB for Title) 23, and backup data 24 about the video title set information 21.

The video object set 23 includes video object (VOB) 26. Incidentally, the video object set can contain a plurality of video objects; however, for convenience of explanation, it is assumed that the video object set 23 includes only one video object 26.

The video object 26 includes a plurality of data units, specifically a plurality of cells. The cells include: cells 31 which are actual data units that can be properly read and reproduced; and dummy cells 32 which are imaginary data units that cannot be properly read or reproduced.

Each cell 31 can contain a navigation pack, a video pack, an audio pack, and a sub-picture pack (not illustrated). The navigation pack includes management information. The video pack is a group of video data. The audio pack is a group of audio data. The sub-picture pack is a group of still image data. The video data, the audio data, and the still image data, included in each cell 31, are error correctable, can be properly read, properly decoded, and properly reproduced.

Each dummy cell 32 describes the data that cannot be properly read or reproduced. Specifically, each dummy cell 32 desirably describes the data that causes an error in reading. More specifically, each dummy cell 32 desirably describes the data that does not allow error correction. For example, the data described in each dummy cell 32 is the data that causes a reading error when the error correction is performed on the data even if the data is normally recorded in a normal recording layer on a normal DVD and if the data is normally irradiated with a light beam for reproduction.

Giving a more specific example to the data described in each dummy cell 32, if the DVD 1 is a DVD-R (DVD-Recordable), the data is forced to be doubly recorded into the same area in the same recording layer and an abnormal pit is formed in the area, to thereby create the data to be described in each dummy cell 32.

Incidentally, the method of generating the data to be described in each dummy cell 32 is not limited to this. It is rather preferable to use the following method. That is, a data arrangement which causes a reading error by the error correction is created in advance by calculation, a group of the data with this data arrangement is stored in advance into a memory element, such as a ROM, and the data arrangement is read from the memory element when each dummy cell 32 is recorded onto the DVD 1.

On the other hand, the video title set information 21 includes a plurality of reproduction specification information, specifically a plurality of program chains (PGC) 40. The video title set information 21 has the plurality of program chains 40 in each individual video title set 16. For convenience of explanation, FIG. 1 shows only the program chains 40 for the video title set #1.

Each program chain 40 is management information or control information for specifying one or more data units from the plurality of data units. Specifically, each program chain 40 is the management information or control information for specifying one or more cells 31 and 32 included in the video object 26 corresponding to the program chain 40. More specifically, each program chain 40 includes one or more cell number information 41 which indicates the cell number of one cell 31 or the cell number of one dummy cell 32.

Incidentally, each program chain 40 shown in FIG. 1 specifies one cell 31 or dummy cell 32. In general, however, one program chain can specify two or more cells, and if specifying the two or more cells, the one program chain can specify the reproduction order of the two or more cells. The original function of the program chain is to specify the reproduction order of the two or more cells. However, for convenience of explanation, the embodiment exemplifies the case that each program chain 40 specifies one cell 31 or dummy cell 32.

Moreover, the program chain 40 includes an actual program chain, which does not include the specification of the dummy cell 32, and an imaginary program chain, which includes the specification of the dummy cell 32. Specifically, the program chain 40 has the actual program chain 40, which does not include the cell number information 41 which indicates the cell number of the dummy cell 32, and the imaginary program chain 40, which includes the cell number information 41 which indicates the cell number of the dummy cell 32. Incidentally, the actual program chain is a specific example of the actual reproduction specification information, and the imaginary program chain is a specific example of the imaginary reproduction specification information.

For example, of the program chains #1 to #n (the set of the program chains 40 for the video title set #1) in FIG. 1, the program chain (PGC) #1 includes the cell number information 41 which indicates the cell number #1 of the cell 31 and does not include the cell number information which indicates the cell number of the dummy cell 32. Thus, the program chain #1 is the actual program chain.

The program chain #2 includes the cell number information 41 which indicates the cell number #2 of the dummy cell 32. Thus, the program chain #2 is the imaginary program chain.

The program chain #3 includes the cell number information 41 which indicates the cell number #3 of the cell 31 and does not include the cell number information which indicates the cell number of the dummy cell 32. Thus, the program chain #3 is the actual program chain.

The program chain #4 includes the cell number information 41 which indicates the cell number #4 of the dummy cell 32. Thus, the program chain #4 is the imaginary program chain.

In the same manner, the program chain #n−2 is the actual program chin, the program chain #n−1 is the imaginary program chain, and the program chain is the actual program chain.

Moreover, as a general rule, each actual program chain includes a post command 42. The post command 42 describes information for specifying another actual program chain to be executed next to the execution of the actual program chain including the post command 42. This information includes the number of another actual program chain to be specified, a command to shift the process to the execution of the another program chain, and the like.

For example, the post command 42 of the program chain #1 in FIG. 1 describes information "Goto PGC#3" for specifying the program chain #3 to be executed next to the execution of the program chain #1. In the example shown in FIG. 1, the post command 42 is added at the tail of the program chain 40. However, the actual program chain with in the laser reproduction order, e.g. the program chain #n in FIG. 1, does not include the post command. Incidentally, the post command 42 is a specific example of the execution specification information.

FIG. 2 shows a reproduction operation on a reproducing apparatus in executing the set of the program chains 40 for the video title set #1 in FIG. 1 on the reproducing apparatus (e.g. a DVD player).

The video title set #1 is provided with the cell #1, the cell #3, the cell #5, . . . , the cell #n−2, and the cell #n, which are to be reproduced in this order. Of course, the cells which constitute the video title set #1 are all the cells 31 and do not include the dummy cells 32.

The set of the program chains 40 for the video title set #1 includes the program chains #1, #2, #3, #4, #5, . . . , #n−2, #n−1, and #n; however, what are actually executed for the reproduction of the video title set #1 are the actual program chains #1, #3, #5, . . . , #n−2, and #n. The imaginary program chains #2, #4, and #n−1 are skipped by the post command 42.

The actual program chain #1 specifies the cell #1, the actual program chain #3 specifies the cell #3, and the actual program chain #5 specifies the cell #5. Moreover, the actual program chain #n−2 specifies the cell #n−2, and the actual program chain #n specifies the cell #n.

Moreover, the post command 42 of the actual program chain #1 specifies the actual program chain #3 as another actual program chain to be executed next, and the post command 42 of the actual program chain #3 specifies the actual program chain #5 as another actual program chain to be executed next. Moreover, the post command 42 of the actual program chain #n−2 specifies the actual program chain #n as another actual program chain to be executed next.

When the set of the program chains 40 is executed by the reproducing apparatus, the video title set #1 is reproduced as shown in FIG. 2. That is, the reproducing apparatus reads the actual program chains shown in FIG. 1, sequentially or as a whole, from the DVD 1, and sequentially executes them in the order of the actual program chains #1, #3, #5, . . . , #n−2, and #n.

Specifically, firstly, the reproducing apparatus executes the actual program chain #1. That is, the reproducing apparatus reads and reproduces the video data, the audio data, and the sub-picture data, which are included in the cell #1 indicated by the cell number information 41 of the actual program chain #1, from the DVD 1. Then, the reproducing apparatus reads the post command 42 of the actual program chain #1 from the DVD 1.

The post command 42 of the actual program chain #1 specifies the actual program chain #3 as the actual program chain to be executed next. The reproducing apparatus executes the actual program chain #3 in accordance with the specification. That is, the reproducing apparatus reads and reproduces the video data, the audio data, and the sub-picture data, which are included in the cell #3 indicated by the cell number information 41 of the actual program chain #3, from the DVD 1. Then, the reproducing apparatus reads the post command 42 of the actual program chain #3, from the DVD 1.

The post command 42 of the actual program chain #3 specifies the actual program chain #5 as the actual program chain to be executed next. The reproducing apparatus executes the actual program chain #5 in accordance with the specification.

The reproducing apparatus subsequently executes the actual program chain in accordance with the specification of the post command 42, and sequentially reproduces the video data, the audio data, and the sub-picture data which are included in the cell specified by the cell number information 41 of each actual program chain. By this, the cells #1, #3, #5, . . . , #n−2, and #n, which constitute the video title set #1, are reproduced.

Hereinafter, it is considered the case that the aforementioned data recorded on the DVD 1 is copied to another DVD 2. As the copy method, there are three possible types of methods. The first method is to copy all the data recorded on the DVD 1 to another DVD 2 at a time without checking the content. The second method is to copy a file about the video title set #1 recorded on the DVD 1 to another DVD 2 at a time without checking the content. The third method is to analysis the program chains 40 about the video title set #1 recorded on the DVD 1 and extract and copy only the cells 31 which constitute the video title set #1.

FIG. 3 shows a situation in which it is tried to copy all the data recorded on the DVD 1 to another DVD 2 at a time without checking the content. The data recorded on the DVD 1 includes the dummy cell 32. The dummy cell 32 describes the data that cannot be properly read or reproduced, for example, the data that does not allow the error correction. Therefore, if the data described in the dummy cell 32 is the data that cannot be properly read, the dummy cell 32 cannot be read even if it is tried to copy all the data recorded on the DVD 1 to another DVD 2 at a time, and the copy of the DVD 1 fails. For example, the reading error is generated in the middle of the copy, and the operation of a copy apparatus or copy software is stopped.

FIG. 4 shows a situation in which it is tried to copy the file about the video title set #1 recorded on the DVD 1 to another DVD 2 at a time without checking the content. The video title set #1 recorded on the DVD 1 includes the dummy cell 32. Therefore, if the data described in the dummy cell 32 is the data that cannot be properly read, the dummy cell 32 cannot be read even if it is tried to copy the file about the video title set #1 recorded on the DVD 1 to another DVD 2 at a time, and the copy of the DVD 1 fails.

FIG. 5 shows a situation in which it is tried to analysis the program chains 40 about the video title set #1 recorded on the DVD 1 and extract and copy only the cells which constitute the video title set #1. In the copy method shown in FIG. 5, the copy apparatus or copy software detects the cell specified by each program chain 40, reads only the cell specified by each program chain 40, and records it onto the DVD 2.

However, the program chains 40 recorded on the DVD 1 include the imaginary program chains. Then, the cell specified by the imaginary program chain is the dummy cell 32.

The copy apparatus or copy software cannot distinguish between the actual program chain and the imaginary program chain. The copy apparatus or copy software equally treats all the program chains 40 for the video title set #1, equally detects the cell specified by each program chain 40 regardless of whether it is the cell 31 or the dummy cell 32, and equally tries to read it.

Therefore, the copy apparatus or copy software tries to read the dummy cell 32. However, if the data described in the dummy cell 32 is the data that cannot be properly read, the copy apparatus or copy software fails in reading. Then, in the end, it fails in the copy of the DVD 1.

As explained above, in the data structure recorded on the DVD 1, the program chains 40 include the imaginary program chains including the specification of the dummy cells 32. Therefore, the copy of the data recorded on the DVD 1 cannot be realized even if the copy is tried in an advanced copy method in which the copy apparatus or copy software analyzes each program chain. Therefore, it is possible to increase an effect of preventing the illegal copy, to thereby strength the copyright protection or the like.

Incidentally, the aforementioned embodiment exemplifies the structure in which the cell 31 and the dummy cell 32 are disposed substantially alternately in the video object 26. The present invention, however, is not limited to this. A proper number of dummy data, which allow the reading or reproduction of the content data to be prevented, may be disposed in the video object 26 at proper intervals, which allow the reading or reproduction of the content data to be prevented.

Moreover, the aforementioned embodiment exemplifies the case that the individual program chain 40 includes one cell number information 41. The present invention, however, is not limited to this. For example, the actual program chain may include a plurality of cell number specification information 41, each of which indicates the cell 31. Moreover, the imaginary program chain may mixedly include the cell number specification information 41 which indicates the cell 31 and the cell number information 41 which indicates the dummy cell 32.

Moreover, the aforementioned embodiment exemplifies the case that the post command 42 is applied only to the actual program chain. The present invention, however, is not limited to this. The post command 42 may be applied to the imaginary program chain. This provides the consistent data structure between the actual program chain and the imaginary program chain, so that the copy apparatus or copy software more hardly distinguishes between the actual program chain and the imaginary program chain. Therefore, it is possible to further increase the effect of preventing the illegal copy.

Moreover, the aforementioned embodiment exemplifies the case that the present invention is applied to the DVD; however, the present invention is not limited to this. For example, the present invention can be applied to other information recording media, such as a Blu-ray disc and a HD-DVD.

Moreover, the aforementioned embodiment exemplifies the case that the present invention is applied to the data structure based on the DVD video standard; however, the present invention is not limited to this. For example, the present invention can be applied to a data structure based on a VR (Video Recording) standard.

Embodiment of Recording Apparatus

FIG. 6 shows a recording apparatus in an embodiment of the present invention. A recording apparatus 50 in FIG. 6 is, for example, a DVD recorder.

The recording apparatus 50, as shown in FIG. 6, is provided with: a dummy cell generating device 51; a program chain (PGC) generating device 52; and a recording device 53. The dummy cell generating device 51 generates the dummy cell 32. The program chain generating device 52 generates the plurality of program chains 40 each of which specifies one or more cells 31 or dummy cells 32 from among the video object 26. That is, the program chain generating device 52 generates the actual program chain, which does not include the specification of the dummy cell 32, and the imaginary program chain, which includes the specification of the dummy cell 32, and includes them in the set of the program chains 40. Moreover, the program chain generating device 52 generates the post command 42 and applies this to the actual program chain. The recording device 53 records the video object 26 including the cell 31 and the dummy cell 32, onto the DVD1. Moreover, the recording device 53 records the plurality of program chains 40 onto the DVD 1. Incidentally, the dummy cell generating device 51 is a specific example of the imaginary data unit generating device, the program chain generating device 52 is a specific example of the reproduction specification information generating device, and the recording device 53 is a specific example of the first recording device and the second recording device.

FIG. 7 shows a DVD player in which the recording apparatus 50 is embodied. A DVD recorder 100 in FIG. 7 is provided with: a data reception device 101; an encoder 102; a hard disk drive 103; a disc recording control circuit 104; an optical pickup 105; a decoder 106; digital-analog converters 107 and 108; a CPU (Central Processing Unit) 109; a ROM (Read Only Memory) 110; and a RAM (Random Access Memory) 111. In the DVD recorder 100, the aforementioned dummy cell generating device 51 of the recording apparatus 50 is embodied by the CPU 109 and the ROM 110. Moreover, the program chain generating device 52 is embodied by the CPU 109. Moreover, the recording device 53 is embodied by the disc recording control circuit 104 and the optical pickup 105 or the like.

When the set of the content data is recorded onto e.g. a rewritable type DVD 200, the DVD recorder 100 operates as follows. That is, the data reception device 101 receives the video data, the audio data, and the sub-picture data to be recorded onto the DVD 1, from the exterior. The data reception device 101 may be a television reception circuit. The data received from the data reception device 101 is supplied to the encoder 102.

The encoder 102 encodes the video data, the audio data, and the sub-picture data, to thereby generate the cell 31. At this time, the encoder 102 encrypts the video data, the audio data, and the sub-picture data.

When the encoder 102 performs the encoding, the CPU 109 supplies the dummy cell 32 to the encoder 102. The encoder 102 receives the dummy cell 32, inserts the dummy cell 32 to the cell 31, and generates eh video object 26. Moreover, the encoder 102 and the CPU 109 generate other data which constitute the video title set 16.

Then, when the video title set 16 generated by the encoder 102 and the CPU 109 is recorded onto a hard disk, the data which constitute the video title set 16 is supplied to the hard disk drive 103. The hard disk drive 103 records the data onto the hard disk. On the other hand, when the video title set 16 generated by the encoder 102 and the CPU 109 is recorded onto the DVD 200, the data which constitute the video title set 16 is supplied to the disc recording control circuit 104. The disc recording control circuit 104 records the data onto the DVD 200.

By this, the set of the content data in the same data structure as that recorded on the aforementioned DVD 1 is recorded onto the hard disk or the DVD 200.

Incidentally, the DVD recorder 100 is also provided with a function of reproducing the data recorded on the hard disk or the DVD 200. The decoding in the data reproduction is performed by the decoder 106, and the decoded video data is converted to an analog video signal by a digital-analog converter for video and is outputted to e.g. a display panel apparatus. Moreover, the decoded audio data is converted to an analog audio signal by a digital-analog converter for audio and is outputted to e.g. a speaker.

As explained above, according to the recording apparatus 50 or the DVD recorder 100 which is the embodiment thereof, it is possible to record the set of the content data in the same data structure as that recorded on the DVD 1, onto the information recording medium, such as the DVD 200. This can increase the effect of preventing the illegal copy.

Incidentally, in the present invention, various changes may be made, if desired, without departing from the essence or spirit of the invention which can be read from the claims and the entire specification. An information recording medium, a data structure, a recording apparatus, and a computer program which realizes these functions, all of which involve such changes, are also intended to be within the technical scope of the present invention.

INDUSTRIAL APPLICABILITY

The information recording medium, the data structure, and the recording apparatus according to the present invention can be applied to an information recording medium, such as a DVD, in the structure for realizing the prevention of the illegal copy of the content data, and a recording apparatus, such as a DVD recorder. Moreover, they can be applied to a recording apparatus or the like which is mounted on various computer equipment for consumer use or for commercial use, or which can be connected to various computer equipment.

The invention claimed is:

1. An information recording medium on which a plurality of data units and a plurality of reproduction specification information are recorded, each of the plurality of reproduction specification information specifying one or more data units from among the plurality of data units,
the plurality of data units including an actual data unit, which can be read and reproduced, and an imaginary data unit, which cannot be read and reproduced,
the plurality of reproduction specification information including actual reproduction specification information, which does not include specification of the imaginary data unit, and imaginary reproduction specification information, which includes specification of the imaginary data unit,
the actual reproduction specification information including execution specification information for specifying another actual reproduction specification information to be executed next to the execution of certain one actual reproduction specification information.

2. The information recording medium according to claim 1, wherein the execution specification information included in the actual reproduction specification information specifies another actual reproduction specification information to be executed next so as to read and reproduce only the actual data unit from among the plurality of data units.

3. The information recording medium according to claim 1, wherein the imaginary data unit includes data which causes an error in reading.

4. The information recording medium according to claim 1, wherein the actual data unit is a cell, and the imaginary data unit is a dummy cell.

5. The information recording medium according to claim 1, wherein each of the plurality of reproduction specification information is a program chain.

6. A recording device comprising:
an imaginary data unit generating device for generating an imaginary data unit which cannot be read;
a first recording device for recording a plurality of data units onto an information recording medium, the plurality of data units including an actual data unit which can be read and reproduced and the imaginary data unit;
a reproduction specification information generating device for generating a plurality of reproduction specification information, each of which specifies one or more data units from among the plurality of data units; and
a second recording device for recording the plurality of reproduction specification information onto the information recording medium,
said reproduction specification information generating device generating actual reproduction specification information, which does not include specification of the imaginary data unit, and imaginary reproduction specification information, which includes specification of the imaginary data unit, and wherein the actual reproduction specification information and the imaginary reproduction specification information are included in the plurality of reproduction specification information,
the actual reproduction specification information including execution specification information for specifying another actual reproduction specification information to be executed next to the execution of certain one actual reproduction specification information.

* * * * *